US010010108B2

(12) United States Patent
Fath

(10) Patent No.: US 10,010,108 B2
(45) Date of Patent: Jul. 3, 2018

(54) METHOD OF DISPLAYING ELECTRONIC VAPING DEVICE, DISPLAY PACKAGES WITH DIVIDER, BLANKS FOR FORMING DISPLAY PACKAGE FOR CONTAINING ELECTRONIC VAPING DEVICE, AND METHOD OF MANUFACTURING DISPLAY PACKAGE FOR ELECTRONIC VAPING DEVICE

(71) Applicant: Altria Client Services LLC, Richmond, VA (US)

(72) Inventor: Scott A. Fath, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

(21) Appl. No.: 14/725,556

(22) Filed: May 29, 2015

(65) Prior Publication Data

US 2015/0342252 A1     Dec. 3, 2015

Related U.S. Application Data

(60) Provisional application No. 62/004,315, filed on May 29, 2014.

(51) Int. Cl.
*A24F 15/12* (2006.01)
*B29C 65/00* (2006.01)
(Continued)

(52) U.S. Cl.
CPC .............. *A24F 15/12* (2013.01); *B29C 65/48* (2013.01); *B29C 66/4332* (2013.01);
(Continued)

(58) Field of Classification Search
CPC ..... A24F 15/12; B65D 5/3607; B65D 5/4204; B65D 5/48014; B65D 5/5007;
(Continued)

(56) References Cited

U.S. PATENT DOCUMENTS

D117,986 S   12/1939 Weiss
2,354,239 A   7/1944 Williamson
(Continued)

FOREIGN PATENT DOCUMENTS

CN    102232040 A    11/2011
CN    203186741 U    9/2013
(Continued)

OTHER PUBLICATIONS

International Search Report and Written Opinion dated Oct. 21, 2015 for International Application No. PCT/US2015/033253.
(Continued)

*Primary Examiner* — Chun Cheung
(74) *Attorney, Agent, or Firm* — Harness, Dickey & Pierce, P.L.C.

(57) ABSTRACT

A method of displaying an electronic vaping device, display packages, blanks for forming a display package for containing an elongated body housing an electronic vaping device, and a method of manufacturing a display package for an electronic vaping device, include establishing a box structure having an inner cavity and a side portion, dividing the side portion into a lower retention portion, an upper retention portion, and a window recess portion, the dividing including establishing a side recess panel at a location along a first side panel of the box structure, establishing a front recess panel along a front panel of the box structure, and establishing the window recess portion by folding the first and front recess panels into the box structure. The front recess panel is attached to the side recess panel, and the front recess panel has a width greater than that of the side recess panel.

24 Claims, 7 Drawing Sheets

(51) Int. Cl.

| | | |
|---|---|---|
| *B29C 65/48* | (2006.01) | |
| *B65D 5/42* | (2006.01) | |
| *B65D 5/49* | (2006.01) | |
| *B65D 5/48* | (2006.01) | |
| *B65D 5/50* | (2006.01) | |
| *B65D 5/36* | (2006.01) | |
| *B65D 5/54* | (2006.01) | |
| *B29L 31/00* | (2006.01) | |

(52) U.S. Cl.
CPC ......... *B65D 5/3607* (2013.01); *B65D 5/4204* (2013.01); *B65D 5/48014* (2013.01); *B65D 5/5007* (2013.01); *B65D 5/5016* (2013.01); *B65D 5/542* (2013.01); *B29L 2031/712* (2013.01); *Y10T 156/1051* (2015.01)

(58) Field of Classification Search
CPC ...... B65D 5/5016; B65D 5/542; B29C 65/48; B29C 66/4332
USPC ................... 206/1.5, 528–540; 229/125.125
See application file for complete search history.

(56) References Cited

U.S. PATENT DOCUMENTS

| | | | |
|---|---|---|---|
| D147,120 S | 7/1947 | Dietrich | |
| 2,464,951 A | 3/1949 | Stengren | |
| 2,611,529 A * | 9/1952 | Currivan | B65D 5/5016 206/418 |
| 2,727,620 A | 12/1955 | Buttery | |
| 2,948,390 A | 8/1960 | Wagaman | |
| 2,980,242 A | 4/1961 | Miller | |
| D190,772 S | 6/1961 | Cuyler | |
| 3,029,934 A | 4/1962 | Hennessey | |
| 3,033,357 A | 5/1962 | Vogel | |
| 3,206,098 A | 9/1965 | Stenger et al. | |
| 3,233,726 A * | 2/1966 | Gero | B65D 5/4204 229/120.15 |
| 3,326,444 A * | 6/1967 | Farquhar | B65D 5/48006 229/120.18 |
| D218,212 S | 7/1970 | Pfrommer | |
| 3,767,037 A * | 10/1973 | Anderson | B65D 5/02 206/497 |
| 3,828,923 A * | 8/1974 | Phillips, Jr. | B65D 5/6688 206/254 |
| 4,106,615 A * | 8/1978 | Hiroshi | B65D 5/4208 206/362.2 |
| 4,125,185 A | 11/1978 | Bliss | |
| 4,342,417 A | 8/1982 | Forbes, Jr. | |
| 4,353,694 A | 10/1982 | Pelerin | |
| 4,524,871 A | 6/1985 | Klinger | |
| D290,175 S | 6/1987 | Bakic | |
| 4,848,563 A | 7/1989 | Robbins | |
| 4,865,204 A | 9/1989 | Vance | |
| D314,146 S | 1/1991 | Scholz | |
| 5,044,548 A | 9/1991 | Olsen et al. | |
| 5,226,534 A | 7/1993 | Kim | |
| D353,712 S | 12/1994 | Aalders | |
| 5,848,690 A | 12/1998 | Granger et al. | |
| 5,944,183 A | 8/1999 | Rowland et al. | |
| 6,050,416 A * | 4/2000 | Blin | B65D 5/4802 206/461 |
| 6,244,501 B1 | 6/2001 | Choi | |
| 6,460,703 B1 | 10/2002 | Thompson et al. | |
| D466,406 S | 12/2002 | Solland | |
| 6,491,211 B1 * | 12/2002 | Evans | B65D 5/38 206/532 |
| D546,669 S | 7/2007 | Sheppard et al. | |
| D563,218 S | 3/2008 | DeMalsche et al. | |
| D576,871 S | 9/2008 | Sheppard et al. | |
| D577,286 S | 9/2008 | Sheppard et al. | |
| 7,424,955 B2 | 9/2008 | Chen | |
| D588,449 S | 3/2009 | Bova et al. | |
| D601,009 S | 9/2009 | Shinn | |
| D602,637 S | 10/2009 | Helenowski | |
| D654,786 S | 2/2012 | Rye et al. | |
| 8,191,707 B2 | 6/2012 | McDonald et al. | |
| D699,103 S | 2/2014 | Rathbone et al. | |
| D699,562 S | 2/2014 | Klauder | |
| D700,049 S | 2/2014 | Athay | |
| D702,546 S | 4/2014 | McAdam | |
| D710,713 S | 8/2014 | Fath | |
| D732,384 S | 6/2015 | Fath | |
| D734,145 S | 7/2015 | Fath et al. | |
| D735,572 S | 8/2015 | Fath et al. | |
| D743,248 S | 11/2015 | Fath et al. | |
| D746,699 S | 1/2016 | Fath | |
| D746,700 S | 1/2016 | Boehnen et al. | |
| D756,780 S | 5/2016 | Grove et al. | |
| D756,781 S | 5/2016 | Grove et al. | |
| 2005/0236282 A1 | 10/2005 | Huska | |
| 2011/0297559 A1 * | 12/2011 | Davis | B65B 25/008 206/5.1 |
| 2012/0061290 A1 | 3/2012 | Delaunay et al. | |
| 2012/0227753 A1 | 9/2012 | Newton | |
| 2013/0140200 A1 | 6/2013 | Scatterday | |
| 2013/0342157 A1 | 12/2013 | Liu | |
| 2014/0097103 A1 | 4/2014 | Cameron | |
| 2014/0262871 A1 | 9/2014 | Fath | |
| 2015/0342252 A1 | 12/2015 | Fath | |
| 2016/0096658 A1 | 4/2016 | Fath | |

FOREIGN PATENT DOCUMENTS

| | | |
|---|---|---|
| CN | 103619715 A | 3/2014 |
| DE | 4339645 A1 | 5/1995 |
| EP | 0465257 A1 | 1/1992 |
| EP | 1818266 A1 | 8/2007 |
| RU | 46078 S | 9/1999 |
| RU | 63280 S | 7/2007 |

OTHER PUBLICATIONS

International Search Report and Written Opinion from corresponding International Application PCT/US2015/053518, dated Feb. 2, 2016.
Website http://alloy.ru Dec. 24, 2012.
Written Opinion by the International Searching Authority in corresponding International Application PCT/US2014/022719, dated Jun. 12, 2014.
International Search Report and Written Opinion from corresponding International Application PCT/US2015/033253, dated Oct. 21, 2015.
Notification of Transmittal of International Preliminary Report on Patentability issued in corresponding International Application No. PCT/US2014/022719, dated Sep. 24, 2015.
Notification Concerning Transmittal of International Preliminary Report on Patentability and International Preliminary Report on Patentability issued in corresponding International Application PCT/US2015/033253, dated Dec. 8, 2016.
HackYa, Philip Morris' Mark 10 Review, Apr. 24, 2014 [earliest online date], [site visited Oct. 19, 2016], Available from internet, <url:http://hackya.com/us/philip-morris-mark-ten-review>.
Office Action dated Mar. 9, 2017 in related U.S. Appl. No. 29/541,752.
Office Action dated Mar. 31, 2017 in related U.S. Appl. No. 14/872,786.
Office Action dated Mar. 22, 2017 in related U.S. Appl. No. 13/843,314.
International Preliminary Report on Patentability dated Apr. 4, 2017 in related PCT/US2015/053518.
U.S. Office Action dated Aug. 24, 2017 in related U.S. Appl. No. 29/546,678.
U.S. Office Action dated Aug. 31, 2017 in related U.S. Appl. No. 13/843,314.
European Examination Report dated Jan. 12, 2018 in European Application No. 15 756 501.1.

(56) References Cited

OTHER PUBLICATIONS

Office Action for corresponding Chinese Application No. 201480024117.3 dated Oct. 17, 2017 and English translation thereof.
U.S. Office Action dated Mar. 15, 2018 in related U.S. Appl. No. 13/843,314.
Russian Search Report dated Feb. 26, 2018 in Russian Application No. 2015144319/12(068246), with English translation.
Russian Decision to Grant dated Feb. 28, 2018 in Russian Application No. 2015144319/12(068246), with English translation.
Chinese Office Action dated May 9, 2018 in Chinese Application No. 201480024177.3, with an English translation.
Chinese Office Action dated May 3, 2018 in Chinese Application No. 201580028674.5, with an English translation.

* cited by examiner

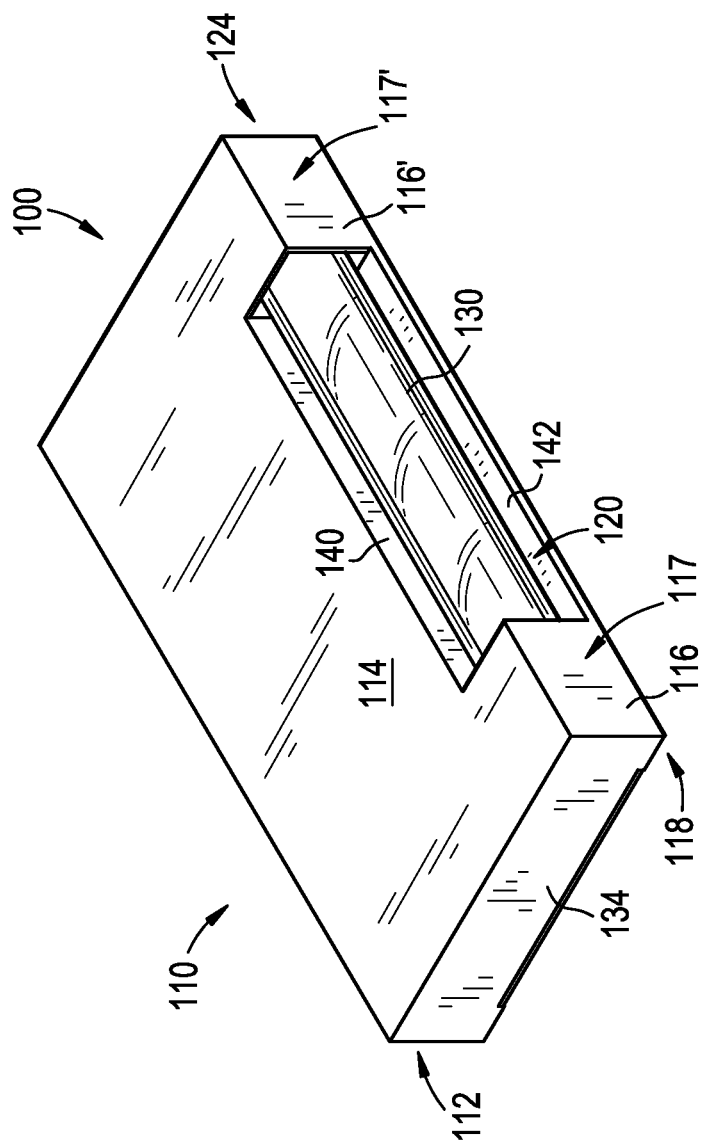

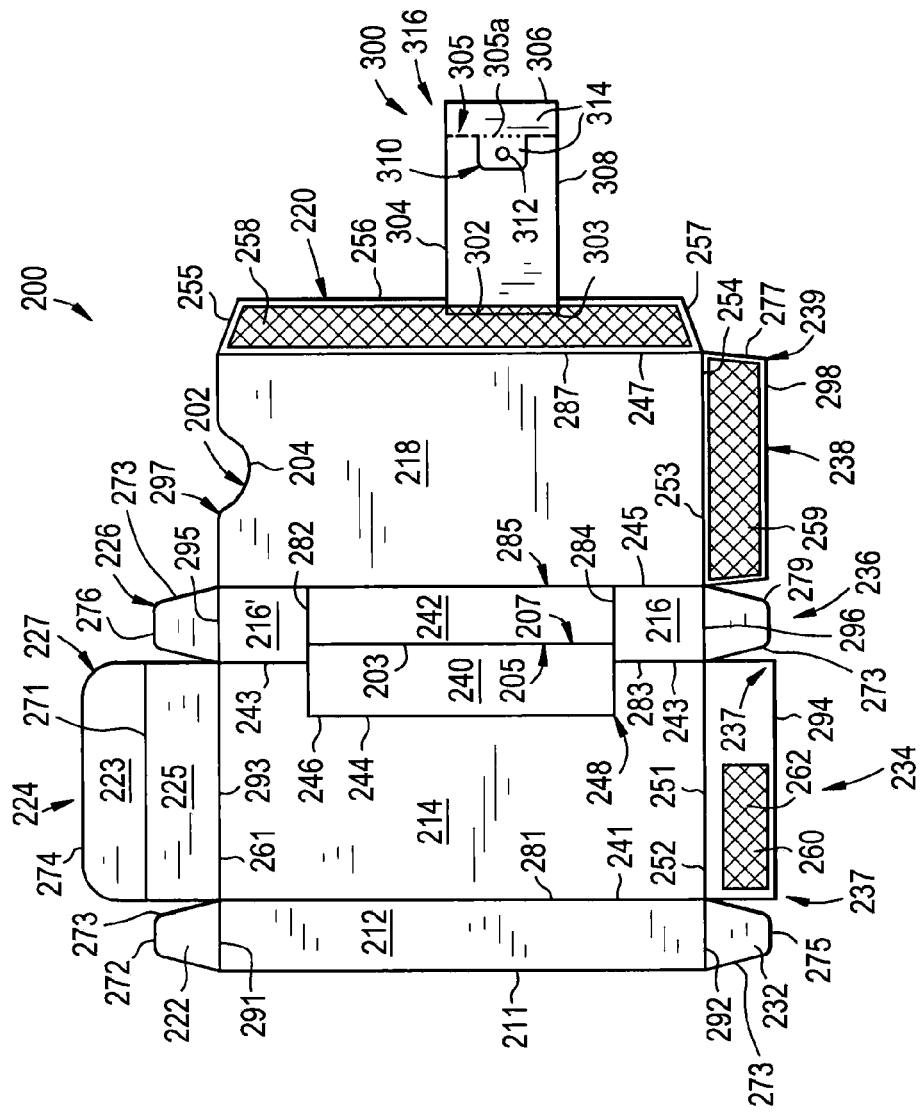

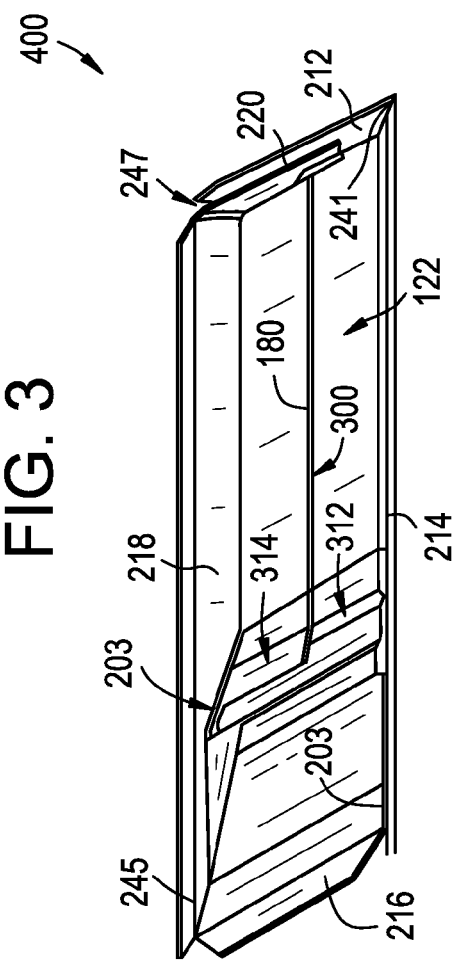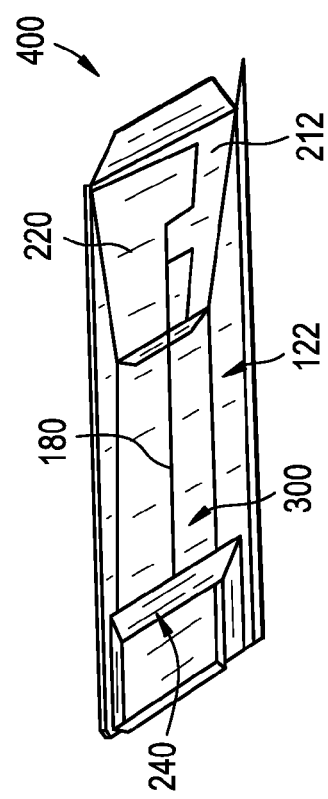

METHOD OF DISPLAYING ELECTRONIC VAPING DEVICE, DISPLAY PACKAGES WITH DIVIDER, BLANKS FOR FORMING DISPLAY PACKAGE FOR CONTAINING ELECTRONIC VAPING DEVICE, AND METHOD OF MANUFACTURING DISPLAY PACKAGE FOR ELECTRONIC VAPING DEVICE

CROSS-REFERENCE TO RELATED APPLICATIONS

This application is a non-provisional application that claims the benefit of priority under 35 U.S.C. § 119(e) to U.S. Provisional Application No. 62/004,315, filed on May 29, 2014, the content of which is incorporated herein by reference in its entirety.

BACKGROUND

Field

Example embodiments relate a method of displaying an electronic vaping device, display packages with a divider for displaying a selected portion of an electronic vaping device, blanks for forming a box for containing an electronic vaping device, and/or a method of manufacturing a display package for an electronic vaping device.

Related Art

In electronic vaping devices, a pre-vapor formulation is vaporized within the electronic vaping devices. The pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerine and propylene glycol. The pre-vapor formulation may contain flavoring agents such as tobacco flavor, menthol, and others, to enhance the experience of the electronic vaping device.

A packing concept particularly suited for the packaging of aerosol generating articles (or, alternatively, electronic vapor generating devices) is disclosed in commonly assigned U.S. patent application Ser. No. 13/843,314 (published as U.S. Publication No. 2014/0262871 A1), the content of which is incorporated herein by reference in its entirety.

SUMMARY

Example embodiments relate a method of displaying an electronic vaping device, display packages with a divider for displaying a selected portion of an electronic vaping device, blanks for forming a rectangular box for containing an electronic vaping device, and/or a method of manufacturing a display package for an electronic vaping device.

In accordance with some example embodiments, a method of displaying at least a portion of an electronic vaping device, includes establishing a box structure having an inner cavity and a side portion, and dividing said side portion into a lower retention portion, an upper retention portion, and a window recess portion. Said recess portion is disposed between said upper and lower retention portions. Said dividing includes establishing a side recess panel at a location along a first side panel of said box structure, (ii) establishing a front recess panel along a front panel of said box structure, and (iii) establishing said window recess portion by folding said first and front recess panels into said box structure. Said front recess panel is attached to said side recess panel. The front recess panel has a width greater than a width of the side recess panel such that a depth of said window recess portion is greater than a width of said window recess portion. Said method of displaying an electronic vaping device further includes extending a divider panel from an inner surface of a second side panel of said box structure across to an inner surface of the front recess panel; and bonding the divider panel to said inner surface of the front recess panel. Said window recess portion, said upper retention portion and said lower retention portion are mutually arranged to retain said electronic vaping device along said side portion, with the at least a portion of said electronic vaping device displayed along said recess portion.

Said establishing said window recess portion may further include bonding said side recess panel to an adjacent portion of a back panel of said box structure.

Said method of displaying an electronic vaping device may further include blocking from display selected portions of said electronic vaping device with said upper and lower retention portions.

In accordance with some example embodiments, a package for displaying a selected portion of an electronic vapor device, includes a box structure having an inner cavity and a side portion. Said side portion is divided into a lower retention portion, an upper retention portion, and a window recess portion. Said window recess portion is between said upper and lower retention portions. Said window recess portion includes a side recess panel at a first location along a first side panel of said box structure, and a front recess panel along a front panel of said box structure. Said front recess panel is attached to said side recess panel, said front recess panel has a width greater than a width of the side recess panel such that a depth of said window recess portion is greater than a width said window recess portion. Said side and front recess panels are folded into said box structure. The package further includes a divider panel being within said inner cavity, the divider panel extending from the front recess panel across to a second side panel of said box structure. Said window recess portion, said upper retention portion and said lower retention portion are mutually arranged to retain said electronic vaping device along said side portion, with the selected portion of said electronic vaping device being displayed along said recess portion.

Said side recess panel may be bonded to an adjacent portion of a back panel of said box structure.

Said upper and lower retention portions may block selected portions of said electronic vaping device from view.

The package may further include a tubular body configured to visibly contain the electronic vaping device within said recess portion.

The divider panel, the front recess panel, the second side panel and the front panel may be mutually arranged to form a first inner cavity portion configured to contain an information booklet in a manner that the information booklet is not visible to a consumer.

The divider panel may be configured to support at least a portion of an end of a universal serial bus (USB) charger within the inner cavity.

In accordance with some example embodiments, a blank for forming a display package for containing an elongated body housing an electronic vaping device, includes a side panel connected to a front panel along a first fold line, the first fold line extending along a first side edge of the front panel, a cavity side panel connected to the front panel along a second fold line, the second fold line extending along a second side edge of the front panel, a back panel connected to the cavity side panel along a third fold line, the third fold line extending along a first side edge of the back panel, a first glue panel connected to the back panel along a fourth fold line, the fourth fold line extending along a second side edge of the back panel, a top panel connected to the front panel along a fifth fold line, the fifth fold line extending along a top edge of the front panel, a bottom panel connected to the front panel along a sixth fold line, the sixth fold line extending along a bottom edge of the front panel, a second glue panel connected to the back panel along an seventh fold line, the seventh fold line extending along a bottom edge of the back panel, a divider panel connected to the first glue panel along an eighth fold line, and an upper cut line and a lower cut line respectively extending across an upper portion and a lower portion of the front panel adjacent to the cavity side panel. The upper and lower cut lines extend across the cavity side panel, respectively, so as to define a first cavity panel and a second cavity panel. Said first cavity panel has a width greater than a width of the second cavity panel. Upon assembly of the display package, the first cavity panel and the second cavity panel are perpendicular to the front panel and the cavity side panel, respectively, so as to form a side cavity configured to receive the elongated body. A depth of the side cavity is greater than a width of the side cavity. The divider panel is configured to be bonded to an inner surface of the first cavity panel so as to divide an inner cavity of the box. The display package has a substantially rectangular shape.

The blank may further include a first upper dust panel connected to the side panel along a top edge of the side panel; a second upper dust panel connected to the cavity side panel along a top edge of the cavity side panel; a first lower dust panel connected to the side panel along a lower edge of the side panel; and a second lower dust panel connected to the cavity side panel along a lower edge of the cavity side panel. The top panel has an upper flap panel and an end panel. The upper flap panel is connected to the end panel along a ninth fold line.

Sidewalls of the first and second upper dust panels may be recessed.

The blank may further include a ninth fold line connecting an inner edge of the upper cut line and an inner edge of the lower cut line on the front panel.

The blank of claim may further include a varnish-free area on the bottom panel, the varnish-free area being configured to include a date code area.

The blank may further include a recess cut line within an upper edge of the back panel.

In accordance with some example embodiments, a blank for forming a display package for containing an elongated body housing an electronic vaping device, includes a side panel connected to a front panel along a first fold line, the first fold line extending along a first side edge of the front panel; a cavity side panel connected to the front panel along a second fold line, the second fold line extending along a second side edge of the front panel; a back panel connected to the cavity side panel along a third fold line, the third fold line extending along a first side edge of the back panel; a first glue panel connected to the back panel along a fourth fold line, the fourth fold line extending along a second side edge of the back panel; a top panel connected to the front panel along a fifth fold line, the fifth fold line extending along a top edge of the front panel; a bottom panel connected to the front panel along a sixth fold line, the sixth fold line extending along a bottom edge of the front panel; a second glue panel connected to the back panel along a seventh fold line, the seventh fold line extending along a bottom edge of the back panel; a third glue panel connected to the back panel along a ninth fold line, which extends along the upper edge of the back panel; a divider panel connected to first glue panel along an eighth fold line; and an upper cut line and a lower cut line respectively extending across an upper portion and a lower portion of the front panel adjacent to the cavity side panel. The upper and lower cut lines extend across the cavity side panel, respectively, so as to define a first cavity panel and a second cavity panel. Said first cavity panel have a width greater than a width of the second cavity panel. Upon assembly of the display package, the first cavity panel and the second cavity panel are perpendicular to the front panel and the cavity side panel, respectively, so as to form a side cavity configured to receive the elongated body. A depth of the side cavity is greater than a width of the side cavity. The display package has a substantially rectangular shape.

The blank may further includes a ninth fold line connecting an inner edge of the upper cut line and an inner edge of the lower cut line on the front panel; and tenth fold lines extending between the upper cut line and the lower cut line respectively forming an outer edge of the first cavity panel and an inner edge of the second cavity panel.

The blank may further include a first cut line near an upper edge of the back panel, the first cut line having a semi-circular shape.

The blank may further include a first upper dust panel connected to the side panel along a top edge of the side panel; and a varnish-free area on the bottom panel, the varnish-free area being configured to include a date code area.

In accordance with some example embodiments, a method of manufacturing a display package for containing an elongated body housing an electronic vaping device, includes partially erecting a box from a blank so as to have a first opening at a bottom of the box and a second opening at a top of the box. The blank includes a side panel connected to a front panel along a first fold line, the first fold line extending along a first side edge of the front panel, a cavity side panel connected to the front panel along a second fold line, the second fold line extending along a second side edge of the front panel, a back panel connected to the cavity side panel along a third fold line, the third fold line extending along a first side edge of the back panel, a first glue panel connected to the back panel along a fourth fold line, the fourth fold line extending along a second side edge of the back panel, an upper cut line and a lower cut line respectively extending across an upper portion and a lower portion of the front panel adjacent to the cavity side panel, the upper and lower cut lines extending across the cavity side panel, respectively, so as to define a first cavity panel and a second cavity panel, and a divider panel connected along an outer portion of the first glue panel along a first divider panel fold line. The method further includes pre-folding the blank along the fourth fold line; folding the blank along the first divider panel fold line and the second divider panel fold line; folding the blank sequentially along the third fold line and the first fold line such that the side panel and the first glue panel overlap; applying glue to at least one of an outer portion of the divider panel and a back side of the first cavity panel; applying glue to at least one of a back side of the second cavity panel and a backside side of the back panel; adhering the second cavity panel to the back panel; and applying glue to at least one of the side panel and the first glue panel to adhere the side panel to the first glue panel.

BRIEF DESCRIPTION OF THE DRAWINGS

Example embodiments will be more clearly understood from the following detailed description taken in conjunction with the accompanying drawings. FIGS. 1-11 represent non-limiting, example embodiments as described herein.

FIG. 1 is a perspective view of an electronic vaping device in accordance with some example embodiments;

FIG. 2 is a plan view of blank for forming an electronic vaping device in accordance with some example embodiments;

FIG. 3 is a bottom view of a partially erected blank as shown in FIG. 2 in accordance with some example embodiments;

FIG. 4 is another bottom view of a partially erected blank as shown in FIG. 2 in accordance with some example embodiments;

FIG. 5 is an end view of an erected blank as shown in FIG. 2 in accordance with some example embodiments;

FIG. 6 is a plan view of a blank for forming an electronic vaping device in accordance with some example embodiments;

FIG. 7 is a bottom view of a partially erected blank as shown in FIG. 6 in accordance with some example embodiments;

FIG. 8 is another bottom view of a partially erected blank as shown in FIG. 6 in accordance with some example embodiments;

FIG. 9 is a plan view of a blank for forming an electronic vaping device package in accordance with some example embodiments;

FIG. 10 is a view of a portion of the blank as shown in FIG. 9 in accordance with some example embodiments; and FIG. 11 is a bottom view of a partially erected blank as shown in FIG. 9 in accordance with some example embodiments.

DETAILED DESCRIPTION

Figure 6:
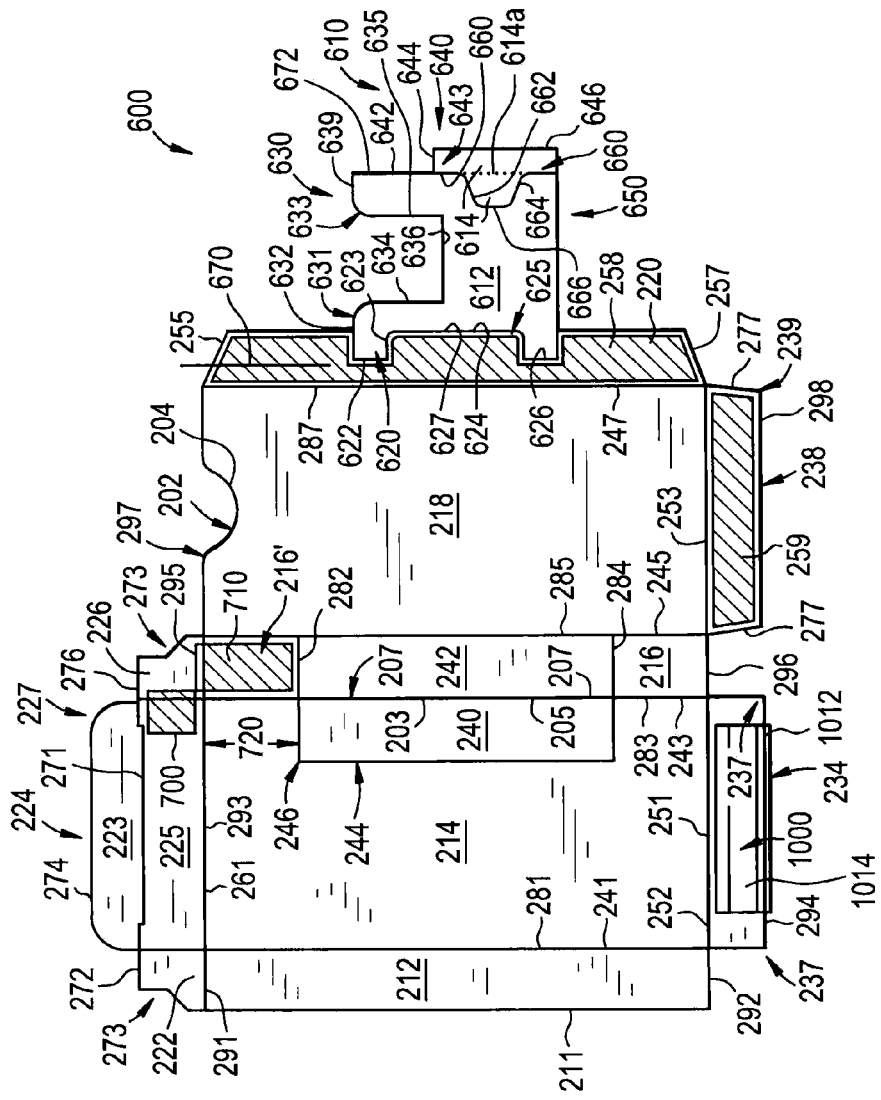

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated or under-exaggerated for clarity or scaling, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

Example embodiments relate a method of displaying an electronic vaping device, display packages with a divider for displaying a selected portion of an electronic vaping device, blanks for forming a rectangular box for containing an electronic vaping device, and/or a method of manufacturing a display package for an electronic vaping device In accordance with some example embodiments, a blank (as shown in FIG. 2) for forming a display package (as shown in FIG. 1) operable to contain at least one item such as an electronic vapor generating device, and in particular, an electronic vaping device, is disclosed. The at least one electronic vaping device can be held securely within an elongated hollow cylinder or tube within a view recess or side edge cavity 120 along an outer side edge portion of the package 100, such that the electronic vaping device is visible to a purchaser and/or consumer.

FIG. 1 is a perspective view of an electronic vaping device package in accordance with some example embodiments.

Referring to FIG. 1, the electronic vaping package 100 includes a rectangular box (or box portion) 110, which is a substantially rectangular parallelepipedal shaped box, with right-angled longitudinal and right-angled transverse edges. The rectangular box portion 110 includes an inner cavity 122 (shown in FIGS. 3-5), and a viewing window or side cavity 120, which is configured to receive an encased electronic vaping device (not shown). The electronic vaping device is encased in a transparent/translucent, tubular or elongated hollow cylinder (or body) 130, which is configured to fit within the viewing recess or side edge cavity 120 of the box portion 110 of the electronic vaping device package 100. In accordance with some example embodiments, the tubular or elongated hollow cylinder 130 is a transparent hollow cylinder having at least one removable cap or lid on one end, and a closed or non-removable cap or end on the opposite end. For example, in accordance with some example embodiments, the elongated hollow cylinder 130 can be a clear glass or plastic tube.

Figure 5:
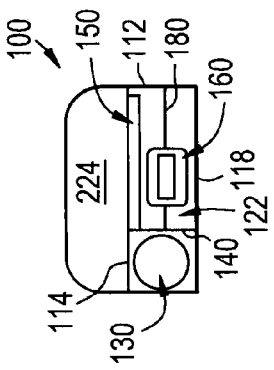

Referring to FIGS. 1 and 5, in accordance with some example embodiments, the rectangular box portion 110 includes a side panel 112, a front panel 114, a partial cavity side panel 116, a back panel 118, a top panel 124, and a bottom panel 134. The side cavity 120 within the rectangular box portion 110 is formed by folding inwardly a front recess panel 140 located along an outer edge or portion of a front panel 114 and a side recess panel 142 located along the cavity side panel 116 of the rectangular box portion 110. When folded, the recess panels 140, 142 are about 90 degrees (or perpendicular) to the front panel 114 and the cavity side panel 116, respectively. By appearances, the cavity side panel 116 includes an upper cavity side panel portion 116 and a lower cavity side panel portion 116', which are collectively referenced as cavity side panel 116.

In accordance with some example embodiments, the window or viewing cavity 120 extends a distance less than a height of the front panel 112 to establish retention portions 117, 117', which retain the end portions of an elongated hollow cylinder 130 within box portion 110, with portion of the cylinder 130 viewable along the side cavity 120. For example, in accordance with some example embodiments, the length of the side edge cavity is less than the length of the hollow cylinder 130. In addition, the length of the hollow cylinder 130 can be substantially the same as the length of the front panel 114 so as to limit up-and-down movement of the cylinder (tube) 130. In addition, the ends (not shown) of the hollow cylinder 130 can be covered by the retention portions 117, 117' of the box 100. In accordance with some example embodiments, the diameter of the hollow cylinder 130 can be about the same as a width of the side cavity 120, and which corresponds to the width of the recess panels 140, 142.

In accordance with some example embodiments, the inner cavity 122 includes a divider 180 (FIG. 5), which extends from an inner surface of the front recess panel 140 across to an inner surface of the side panel 112 on a side opposite thereof. In accordance with some example embodiments, the divider 180 extends parallel to the front and back panels 114, 118. The divider 180 can be a rectangular panel having a width about equal to a distance from inner surface of the front recess panel to the inner surface of the side panel 112. The height of the divider 180 can be from about 10 mm to about 60 mm, for example, 25 mm. In accordance with some example embodiments, the divider 180 can be positioned at equal distance from the front panel 114 and the back panel 118.

FIG. 2 is a plan view of a blank for forming an electronic vaping device in accordance with some example embodiments.

Referring to FIG. 2, in accordance with some example embodiments, a blank 200 for forming the rectangular box having a side cavity as shown in FIG. 1 is shown. The blank 200 includes a first complete side panel 212 connected to a front panel 214 along a first fold line 241. The first fold line 241 extends along a first side edge 281 of the front panel 214. Upper and lower side panel portions, 216, 216' (collectively side panel 216) are connected to the front panel 214 along a second fold line 243. The second fold line 243 extends along a second side edge 283 of the front panel 214. A back panel 218 is connected to the cavity side panel 216 along a third fold line 245. The third fold line 245 extends along a first side edge 285 of the back panel 218. A first glue panel 220 connects to the back panel 218 along a fourth fold line 247. The fourth fold line 247 extends along a second side edge 287 of the back panel 218.

In accordance with some example embodiments, a divider panel 300 is connected along an outer portion of the first glue panel 220. The divider panel 300 includes a first side edge 302, which is connected (or directly attached) to the outer portion of the first glue panel 220 along a twelfth (or first divider panel) fold line 303, a top edge 304, a second side edge 306, and a bottom edge 308. The divider panel 300 also includes a U-shaped cut 310 having a second divider panel fold line 305. The second divider fold line 305 extends along an open end of the U-shaped cut 310 and forms a base portion upon assembly of the resultant box 110, where the fold line 305 helps partially define a pivoting axis line 305a extending across a width of the divider panel 300.

The blank 200 also includes a first upper dust panel 222 connected to the side panel 212 along a top edge 291 of the side panel 212, and a first lower dust panel 232 connected to the side panel 212 along a lower edge 292 of the side panel 212. A top panel 224 is connected to the front panel 214 along a fifth fold line 261. The fifth fold line 261 extends along a top edge 293 of the front panel 214. In accordance with some example embodiments, the top panel 224 has an upper flap panel (or tuck panel) 223 and an end (top) panel 225. The upper flap panel or tuck panel 223 is connected to the end panel 225 along a sixth fold line 271. An outer bottom panel 234 is connected to the front panel 214 along a seventh fold line 251. The seventh fold line 251 extends along a bottom edge 252 of the front panel 214. A second upper dust panel 226 is connected to the cavity side panel 216 along a top edge 295 of the cavity side panel 216, and a second lower dust panel 236 is connected to the cavity side panel 216 along a bottom edge 296 of the cavity side panel 216. In accordance with some example embodiments, the first and second lower dust panels 232, 236 can include an outer edge 275, 279 opposite to the fold lines 292, 296, respectively, and sidewalls 273 each connected to a respective one of the outer edge 275, 279 by a rounded edge. In accordance with some example embodiments, a second (inner) glue panel 238 is connected to the back panel 218 along an eighth fold line 253. The eighth fold line 253 extends along a bottom edge 254 of the back panel 218.

The blank 200 also includes an upper cut line 282 and a lower cut line 284 respectively extending transversely across an upper and a lower portion of the front panel 214 adjacent to the upper and lower side panel portions 216, 216' and extending across the cavity side panel 216, respectively. The upper cut line 282 and the lower cut line 284 collectively form a first cavity panel 240 and a second cavity panel 242 within the front panel 214 and between the side panel portions 216, 216', respectively. A ninth (scored) fold line 244 extends between an inner edge 246 of the upper cut line 282 and an inner edge 248 of the lower cut line 284 on the front panel 214. A tenth (scored) fold line 203 extends between the upper cut line 282 and the lower cut line 284 forming an outer edge 205 of the first cavity panel 240 and an inner edge 207 of the second cavity panel 242.

In accordance with some example embodiments, upon assembly of the box 110, the first cavity panel 240 and the second cavity panel 242 are positioned perpendicular to the front panel 214 and the cavity side panel 216, respectively. Panels 240 and 242 form the window or recess 120. In accordance with some example embodiments, the cavity 120 receives the elongated hollow cylinder 130. In accordance with some example embodiments, the upper and lower cut lines 282, 284 extend across the front panel 214 a distance equal to a width of the cavity side panel 216.

In accordance with some example embodiments, the side panel 212 has a vertical free edge 211. The first side panel 212 and the cavity side panel 216, each includes a lower edge 292, 296. In addition, each of the first and second dust panels 222, 226 can include an outer edge 272, 276 opposite to the fold lines 291, 295, respectively, and sidewalls 273 each connected to a respective one of the outer edges 272, 276 by a rounded edge. The top panel 224, the bottom panel 234, and the second glue panel 238, each have a free outer edge 274, 294, 298. The back panel 218 includes a recessed portion 202 within an upper edge 297 of the back panel 218, which provides assistance and/or access for a consumer to contents enclosed within the inner cavity 122 of the box 110. For example, as shown in FIG. 5, in accordance with some example embodiments, a booklet 150 and/or a USB charger 160 can be stored within the inner cavity 122 of the box 110.

The blank 200 may include a finish or varnish on the clay (printable) side of the blank 200. In accordance with some example embodiments, the first glue panel 220, the bottom panel 234, and the second glue panel 238 can each include a varnish-free area or portion 258, 260, 259, respectively, which may improve the bonding formed by the glue, for example, a hot-melt adhesive material, and/or adhesive tape. In accordance with some example embodiments, the first glue panel 220 has a pair of angled edges 255, 257, which are slightly tapered to a vertical free edge 256. For example, in accordance with some example embodiments, the varnish-free areas 258, 259 of the first glue and second glue panel 220, 238 can covers an entirety of the first and second glue panels 220, 238. In accordance with some example embodiments, the varnish-free area 260 of the bottom panel 234 can include a date code area 262. The date code area 262 can have a width of about 20 mm to about 35 mm, for example, 28 mm wide, and a height of about 5 mm to about 15 mm, for example, about 10 mm. In accordance with some example embodiments, the date code area 262 can be positioned about 1.0 mm to 2.0 mm, for example, about 1.5 mm from a left vertical edge and about 1.0 mm to 2.0 mm, for example, about 1.5 mm from a lower free edge of the bottom panel 234.

In accordance with some example embodiments, the side panel 212 has a width of about 15 mm to about 18 mm, for example, about 16.6 mm and a height of about 105 mm to about 115 mm, for example, about 109 mm. The front panel 214 can have a width of about 50 mm to about 60 mm, for example, about 55 mm and a height of about 105 mm to about 115 mm, for example, about 110 mm. The cavity side panel 216 (portions 216, 216') can have a width of about 16 mm to 18 mm, for example, about 17.0 mm, and a height of about 105 mm to about 115 mm, for example, about 109 mm. The back panel 218 can have a width of about 50 mm to about 60 mm, for example, about 54.6 mm, and a height of about 105 mm to about 115 mm, for example, about 109 mm. The first glue panel 220 can have a width of about 10 mm to about 15 mm, for example, about 12.4 mm and a height of about 105 mm to about 115 mm, for example, about 109 mm.

In accordance with some example embodiments, the first cavity panel 240 can have a height of about 65 mm to about 75 mm, for example, about 69 mm, and a width of about 15 mm to about 18 mm, for example, about 16.5 mm. The second cavity panel 242 can have a height of about 65 mm to about 75 mm, for example, about 69 mm, and a width of about 11 mm to about 15 mm, for example, about 13.0 mm. In accordance with some example embodiments, a distance from the cut line 282 to the upper edges 293, 295 of the front panel 214 and the cavity side panel 216, and a distance from the cut line 284 to the lower edges 252, 296 of the front panel 214 and the cavity side panel 216, can each be about 18 mm to about 23 mm, for example, about 20.5 mm.

In accordance with some example embodiments, the first upper dust panel 222 and the first lower dust panel 232 can each have a width of about 15 mm to about 17.5 mm, for example, about 16.6 mm and a height of about 12.5 mm to about 17.5 mm, for example, about 15 mm. The upper flap panel or tuck panel 223 can have a width of about 50 mm to about 60 mm, for example, about 55 mm, and a height of about 12 mm to about 16 mm, for example about 14 mm. In accordance with some example embodiments, the corners of the tuck panel 223 are rounded 227.

The end panel 225 can have a width of about 50 mm to about 60 mm, for example, 55 mm and a height of about 15 mm to about 18 mm, for example, about 16.5 mm. The second upper dust panel 226 and the second lower dust panel 236, each can have a width of about 16 mm to about 18 mm, for example, 17 mm, and a height of about 14 mm to about 17 mm, for example, about 15.5 mm. The bottom panel 234 can have a width of about 50 mm to about 60 mm, for example, 55 mm and a height of about 15 mm to about 17 mm, for example, about 16 mm. In accordance with some example embodiments, the corners 237 of the bottom panel (or end panel) 234 are slightly round at a radius of about 0.5 mm to about 1.5 mm, for example, 1.0 mm.

In accordance with some example embodiments, the first glue panel 220 has a pair of angled outer edges 255, 257, which extend from the second side edge 287 of the back panel 218 inward at an angle of about 10 to 30 degrees and more preferably about 20 degrees. In accordance with some example embodiments, the second glue panel 238 can have a width of about 50 mm to about 60 mm, for example, about 54.6 mm and a height of about 14 mm to about 16 mm, for example, 15 mm. Vertical edges 277 of the second glue panel 238 can be angled, for example, angled at about 2.5 to 7.5 degrees and more preferably about 5.0 degrees. In addition, corners 239 of the second glue panel 238 can be rounded at a radius of about 0.5 mm to 1.5 mm, for example, about 1.0 mm.

In addition, the back panel 218 can have a recess 202 on an upper edge 297 thereof. In accordance with some example embodiments, the recess 202 can have a radius of about 8.5 mm to 10.0 mm, for example, about 9.3 mm and a depth of about 6 mm to about 8 mm, for example, about 7 mm. The recess 202 is located in a center portion of the upper edge 297 of the back panel 218 so as to provide an equal distance from the first side edge 285 and the second side edge 287 to a corresponding edge 204 of the recess 202.

In accordance with some example embodiments, the divider panel 300 can have a width of about 40 mm to about 60 mm, for example, about 50 mm and a height of about 10 mm to about 50 mm, for example, 25 mm. In accordance with some example embodiments, the top edge 304 of divider panel 300 is about 50 mm to about 60 mm, for example, about 52 mm from the upper edge 297 of the back panel 218 and about 30 mm to about 35 mm, for example, 32 mm from the bottom edge 254 of the back panel 218. An U-shaped cut 310 can be positioned about 6 mm to about 10 mm, for example, about 8 mm from the second side edge 306. The U-shaped cut 310 can be about 6 mm to about 10 mm, for example about 8 mm in width and have a base portion of about 10 mm to about 12 mm, for example, about 11 mm. As shown in FIG. 2, the base portion 314 of the U-shape cut out is parallel to the vertical free edge 256 of the second glue panel 220.

In accordance with some example embodiments, the assembled package 100 can have a height of about 105 mm to about 115 mm, for example, 111 mm, a width of about 50 mm to about 60 mm, for example, 55 mm, and a depth of about 16 mm to about 18 mm, for example, 17 mm. In addition, in a flat state, the blank 200 can have a height of about 150 mm to about 160 mm, for example, about 156.5 mm, and a width of about 150 mm to about 160 mm, for example, 155.6 mm without the divider panel 300 and about 200 mm to about 205 mm, for example, about 202.2 mm with the divider panel 300. In accordance with some example embodiments, the partially assembled box 200 is shipped for assembly in a folded and glued format.

FIG. 3 is a bottom view of a partially erected blank as shown in FIG. 2 in accordance with some example embodiments, and FIG. 4 is another bottom view of a partially erected blank as shown in FIG. 2 in accordance with some example embodiments.

Referring to FIGS. 2, 3 and 4, a resultant box structure 400 formed by performing a method for assembling the box (e.g., box 110 in FIG. 1) according to some example embodiments from a single laminar blank (e.g., blank 200 in FIG. 2) is provided. In accordance with some example embodiments, the laminar blank is partially folded and glued prior to shipping to a facility for assembly. For example, in accordance with some example embodiments, the fourth fold line 247 is pre-broken. The first divider panel fold line 303 is then folded 180 degrees. The third fold line 245 is then folded 180 degrees, and then the first fold line 241 is folded 180 degrees. The U-shaped cut 310 of the divider panel 300 can then be folded 180 degrees about the second divider fold line 305, which extends along an open end of the U-shaped cut 310 to form a base unit or portion 316 having a U-shaped cut out 312 and a lower portion 314, which are glued to a back side of the first cavity panel 240. Upon folding the U-shaped cut out 310 about 180 degrees, the depth of the U-shaped cut out 312 and the base portion 316 is about equal to a depth of the first cavity panel 240. The second cavity panel 242, which includes the area of the cavity side panel 216 between the upper cut line 282 and the lower cut line 284, is glued to a back side of the back panel 218. The first glue panel 220 can then be glued to a back side of the side panel 212.

In accordance with some example embodiments, the resultant box 400 structure may be flattened to facilitate shipping. The resultant box 400 is supplied by the manufacturer folded and glued as set forth above. In addition, the resultant boxes 400 are not packed tightly so as to flatten them completely.

FIG. 5 is an end view of an erected blank as shown in FIG. 2 in accordance with some example embodiments.

Referring to FIG. 5, the divider 180 extends from an inner surface of the front recess panel 140 across to an inner surface of the side panel 112 on a side opposite thereof. In accordance with some example embodiments, the divider 180 extends parallel to the front and back panels 114, 118. In accordance with some example embodiments, an instruction booklet 150 and/or a USB charger 160 (or other item of the electronic vaping device) can be placed within the inner cavity 122 of the box 110. The divider 180 includes a recessed panel portion that is configured to receive the USB charger 160 so as to retain the USB charger in a fixed position within the inner cavity 122 of the box 110.

FIG. 6 is a plan view of a blank for forming an electronic vaping device in accordance with some example embodiments.

Referring to FIG. 6, a blank 600 for forming a rectangular box (e.g., box 110 in FIG. 1) having a side cavity (e.g., cavity 120 in FIG. 1), which is operable to contain a hollow elongated cylinder (e.g., elongated cylinder 130 in FIG. 1) is shown in FIG. 6. The blank 600 can include a first complete side panel 212 connected to a front panel 214 along a first fold line 241. The first fold line 241 extends along a first side edge 281 of the front panel 214. Upper and lower side panel portions 216, 216' (collectively side panel 216) are connected to the front panel 214 along a second fold line 243. The second fold line 243 extends along a second side edge 283 of the front panel 214. A back panel 218 is connected to the cavity side panel 216 along a third fold line 245. The third fold line 245 extends along a first side edge 285 of the back panel 218. A first glue panel 220 connects to the back panel 218 along a fourth fold line 247. The fourth fold line 247 extends along a second side edge 287 of the back panel 218.

The blank 600 can also include a first upper dust panel 222 connected to the side panel 212 along a top edge 291 of the side panel 212. A second upper dust panel 226 is connected to the cavity side panel 216 along a top edge 295 of the cavity side panel 216. In addition, each of the first and second dust panels 222, 226 has an outer edge 272, 276 opposite to the fold lines 291 and 295, respectively, and sidewalls 273 connected to the outer edge 272, 276. The sidewalls 273 can include an angled portion extending inward towards the outer edge 272, 276 (i.e., the angled portion is recessed), and a relatively vertical portion extending towards the outer edge 272, 276.

A top panel 224 is connected to the front panel 214 along a fifth fold line 261. The fifth fold line 261 extends along a top edge 293 of the front panel 214. In accordance with some example embodiments, the top panel 224 has an upper flap panel (or tuck panel) 223 and an end (top) panel 225. The upper flap panel or tuck panel 223 is connected to the end panel 225 along a sixth fold line 271. An outer bottom panel 234 is connected to the front panel 214 along a seventh fold line 251. The seventh fold line 251 extends along a bottom edge 252 of the front panel 214. In accordance with some example embodiments, a second (inner) glue panel 238 is connected to the back panel 218 along an eighth fold line 253. The eighth fold line 253 extends along a bottom edge 254 of the back panel 218.

The blank 600 can also include an upper cut line 282 and a lower cut line 284 extending transversely across an upper and a lower portion of the front panel 214 adjacent to the upper and lower side panel portions 216, 216' and extending across the cavity side panel 216, respectively. The upper cut line 282 and the lower cut line 284 collectively form a first cavity panel 240 and a second cavity panel 242 within the front panel 214 and between the side panel portions 216, 216', respectively. A ninth (scored) fold line 244 extends between an inner edge 246 of the upper cut line 282 and an inner edge 248 of the lower cut line 284 on the front panel 214. A tenth (scored) fold line 203 extends between the upper cut line 282 and the lower cut line 284 forming an outer edge 205 of the first cavity panel 240 and an inner edge 207 of the second cavity panel 242.

In accordance with some example embodiments, upon assembly of the box (e.g., box 110 in FIG. 1), the first cavity panel 240 and the second cavity panel 242 are positioned perpendicular to the front panel 214 and the cavity side panel 216, respectively. Panels 240 and 242 form the window or recess 120. In accordance with some example embodiments, the cavity (e.g., cavity 120 in FIG. 1) receives the elongated hollow cylinder (e.g., elongated cylinder 130 in FIG. 1). In accordance with some example embodiments, the upper and lower cut lines 282, 284 extend across the front panel 214 a distance equal to a width of the cavity side panel 216.

In accordance with some example embodiments, the side panel 212 has a vertical free edge 211. The first side panel 212 and the cavity side panel 216, each includes a lower free edge 292, 296. The top panel 224, the bottom panel 234, and the second glue panel 238, each have a free outer edge 274, 294, 298. The back panel 218 includes a recessed portion 202 within an upper edge 297 of the back panel 218, which provides assistance and/or access for a consumer to contents enclosed within the inner cavity 122 of the box 110. As shown in FIG. 2, for example, in accordance with some example embodiments, an information booklet and/or coupons 150, and/or a USB charger 160 (or other item of the electronic vaping device) can be placed within the inner cavity 122 of the box 110.

In accordance with some example embodiments, the blank 600 includes a divider panel 610 connected to the first glue panel 220. The divider 610 includes a recessed panel portion that is configured to receive the USB charger 160 so as to retain the USB charger in a fixed position within the inner cavity 122 of the box 110. The divider panel 610 can include an inner panel 612 and an outer panel 614. The divider panel 610 can include a first side edge 620, which can be connected to the first glue panel 220, a top edge 630, a second side edge 640, and a bottom edge 650. The first side edge 620 can include an upper first side edge 622, an inner first side edge 624, and a lower first side edge 626. The inner first side edge 624 is located between the upper and the lower first sides 622, 626, and includes a pair of inner edges 623, 625, which are rounded and which transition to a relatively vertical inner edge 627. The upper and lower first side edges 622, 626 are formed along a twelfth fold line 670 with the first glue panel 220. The top edge 630 extends outward from the upper first side edge 622 and includes an inner top edge 632, a first vertical edge 634, a lower horizontal edge 636, a second vertical edge 638, and an outer top edge 639. The transitions from the inner top edge 632 to the first vertical edge 634, and from the second vertical edge 638 to the outer top edge 639 are rounded edges 631, 633. In accordance with some example embodiments, the second side edge 640 includes an upper second side edge 642, which extends downward to a horizontal second side edge 644, and a lower second side edge 646. The bottom edge 650 extends horizontally outward from the lower first side edge 626 to the lower second side edge 646. The divider panel 610 can also include a thirteenth (scored) fold line 660, which divides the panel 610 into the inner divider panel 612 and the outer divider panel 614. The thirteenth fold line 660 extends from a lower edge 643 of the upper second side edge 642 downward, and upward from the bottom edge 650 to a pair of side scores 662, 664, which can be angled inward to a relatively vertical inner score line 666. The fold line 660 helps partially define a pivoting axis line 614a extending across a width of the divider panel 610.

In accordance with some example embodiments, the divider panel 610 can have an overall height of about 40 mm to 50 mm, for example, 45 mm, and a width of about 35 mm to 45 mm, for example, 41 mm. The first and second side edge 620, 640 can have a height of about 40 mm to 50 mm, for example 45 mm. The inner and outer top edges 632, 639 can have a length of about 9 mm to 10 mm, the first and second vertical edged 634, 638 can have a length of about 15 mm to 25 mm, for example, 20 mm, and the lower horizontal edge 636 can have a length of about 16 mm to 22 mm, for example, 19 mm. The transitions from the inner top edge 632 to the first vertical edge 634 and the second vertical edge 638 to the outer top edge 639 are rounded edges 631, 633 having a radius of about 3 mm to 5 mm, for example, 4 mm. The upper second side edge 642 can have a length of about 16 mm to 20 mm, for example, 18 mm, the horizontal second side edge 644 can have a length of about 4 mm to 7 mm, for example, 5.5 mm, and the lower second side edge 646 can have a length of about 24 mm to 30 mm, for example 27 mm.

In accordance with some example embodiments, a fourteenth scored or fold line 672 including the upper and lower second side edge 642, 668 has a length of about 5 mm to 9 mm, for example, 7 mm, and a pair of side scores 662, 664, which can be angled inward to a depth of about 9 mm to 10 mm to the relatively vertical inner score line 666, have a length of about 11 mm to 15 mm, for example, 13 mm.

In accordance with some example embodiments, a pressure sensitive tape 1000 can be attached to the backside of the bottom panel 234. For example, in accordance with some example embodiments, the pressure sensitive tape 1000 can have a width of about 35 mm to 45 mm, for example, 40 mm to 41 mm, and a height of about 8 mm to 12 mm. In accordance with some example embodiments, the pressure sensitive tape 1000 can be place on the bottom panel 234, such that about 1 mm to 2 mm, for example, 1 mm of the pressure sensitive tape 100 extends beyond the lower free edge 294 of the bottom panel 234. For example, the pressure sensitive tape 1000 can be a pressure sensitive tape manufactured by 3M, such as 3 M Extended Liner Tape 476XL, 0.5 (½) inch wide liner 1012, and 0.25 (¼) inch adhesive 1014.

The blank 600 may include a finish or varnish on the clay (printable) side of the blank 600. In accordance with some example embodiments, the first glue panel 220 and the second glue panel 238 can each include a varnish-free area or portion 258, 259, respectively, which may improve the bonding formed by the glue, for example, a hot-melt adhesive material, and/or adhesive tape. In accordance with some example embodiments, the first glue panel 220 has a pair of angled edges 255, 257, which are slightly tapered to a vertical free edge 256. For example, in accordance with some example embodiments, the varnish-free areas 258, 259 of the first glue and second glue panel 220, 238 can covers the entire panels 220. In addition, the end panel 225 and the second upper dust panel 226 can include a varnish-free area 700 on an outer portion of the end panel 225 and along an inner portion of the second upper dust panel 226. The upper cavity side panel 216' can include a varnish-free area 710, which can cover the entirety of the cavity side panel 216' and onto a lower portion of the second upper dust panel 226.

In accordance with some example embodiments, the side panel 212 has a width of about 11 mm to about 17 mm, for example, about 13.2 mm and a height of about 105 mm to about 115 mm, for example, about 109 mm. The front panel 214 can have a width of about 50 mm to about 60 mm, for example, about 55 mm and a height of about 105 mm to about 115 mm, for example, about 110 mm. The cavity side panel 216 (portions 216, 216') can have a width of about 12 mm to 18 mm, for example, about 14.0 mm, and a height of about 105 mm to about 115 mm, for example, about 109 mm. The back panel 218 can have a width of about 50 mm to about 60 mm, for example, about 54.6 mm, and a height of about 105 mm to about 115 mm, for example, about 109 mm. The first glue panel 220 can have a width of about 10 mm to about 15 mm, for example, about 12.4 mm and a height of about 105 mm to about 115 mm, for example, about 109 mm.

In accordance with some example embodiments, the first cavity panel 240 can have a height of about 65 mm to about 75 mm, for example, about 69 mm, and a width of about 12 mm to about 18 mm, for example, about 13.5 mm. The second cavity panel 242 can have a height of about 65 mm to about 75 mm, for example, about 69 mm, and a width of about 12 mm to about 18 mm, for example, about 14.0 mm. In accordance with some example embodiments, a distance 720 from the cut line 282 to the upper edges 293, 295 of the front panel 214 and the cavity side panel 216, and a distance 720 from the cut line 284 to the lower edges 252, 296 of the front panel 214 and the cavity side panel 216, can be about 18 mm to about 23 mm, for example, about 20 mm.

In accordance with some example embodiments, the first upper dust panel 222 and the second upper dust panel 226 can each have a width of about 12 mm to about 16 mm, for example, about 13.2 mm and a height of about 11 mm to about 15 mm, for example, about 13 mm. The upper flap panel or tuck panel 223 can have a width of about 50 mm to about 60 mm, for example, about 55 mm, and a height of about 10 mm to about 14 mm, for example about 12 mm. In accordance with some example embodiments, the corners of the tuck panel 223 are rounded 227.

The end panel 225 can have a width of about 50 mm to about 60 mm, for example, 55 mm and a height of about 10 mm to about 15 mm, for example, about 12.7 mm. The bottom panel 234 can have a width of about 50 mm to about 60 mm, for example, 55 mm and a height of about 15 mm to about 17 mm, for example, about 16 mm. In accordance with some example embodiments, the corners 237 of the bottom panel (or end panel) 234 are slightly round at a radius of about 0.5 mm to about 1.5 mm, for example, 1.0 mm.

In accordance with some example embodiments, first glue panel 220 has a pair of angled outer edges 255, 257, which extend from the second side edge 287 of the back panel 218 inward at an angle of about 10 degrees to 30 degrees and more preferably about 20 degrees. In accordance with some example embodiments, the second glue panel 238 can have a width of about 50 mm to about 60 mm, for example, about 54.6 mm and a height of about 14 mm to about 16 mm, for example, 15 mm. The vertical edges 277 of the second glue panel 238 can be angled, for example, angled at about 2.5 degrees to 7.5 degrees and more preferably about 5.0 degrees. In addition, the corners 239 of the second glue panel 238 can be rounded at a radius of about 0.5 mm to 1.5 mm, for example, about 1.0 mm.

In addition, the back panel 218 can have a recess 202 on an upper edge 297 thereof. In accordance with some example embodiments, the recess 202 can have a radius of about 8.5 mm to 10.0 mm, for example, about 9.3 mm and a depth of about 6 mm to about 8 mm, for example, about 7 mm. The recess 202 is located in a center portion of the upper edge 297 of the back panel 218 so as to provide an equal distance from the first side edge 285 and the second side edge 287 to a corresponding edge 204 of the recess 202.

In accordance with some example embodiments, the assembled package 100 can have a height of about 105 mm to about 115 mm, for example, 111 mm, a width of about 50 mm to about 60 mm, for example, 55 mm, and a depth of about 16 mm to about 18 mm, for example, 17 mm. In addition, in a flat state, the blank 600 can have a height of about 140 mm to about 160 mm, for example, about 146 to 147 mm, and a width of about 180 to 190 mm, for example, about 184.2 with the divider panel 610.

Figure 7:
Figure 8:
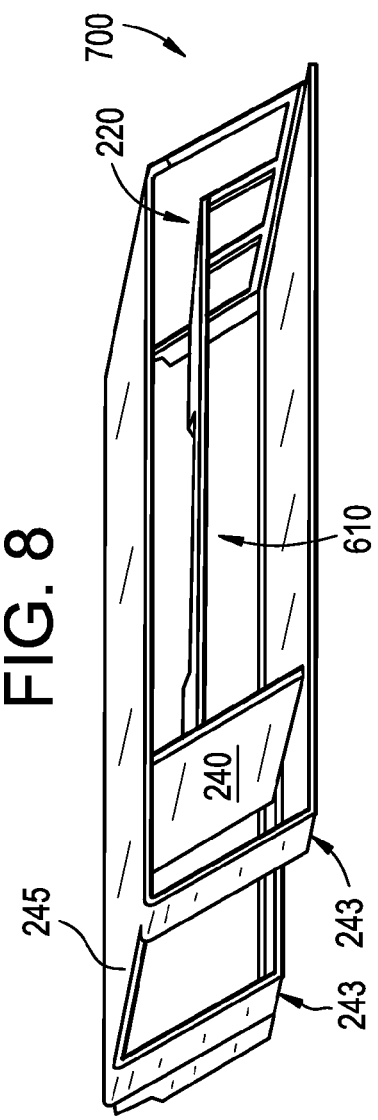

FIG. 7 is a bottom view of a partially erected blank as shown in FIG. 6 in accordance with some example embodiments, and FIG. 8 is another bottom view of a partially erected blank as shown in FIG. 6 in accordance with some example embodiments.

Referring to FIGS. 7 and 8, a resultant box structure 700 from a method for assembling the box (e.g., box 110 in FIG. 1) from a single laminar blank 600 is provided. In accordance with some example embodiments, the laminar blank 600 is partially folded and glued prior to shipping to a facility for assembly. For example, in accordance with some example embodiments, the divider panel is folded 180 degrees. The second fold line 243 and the fourth fold line 247 are each folded 180 degrees. The third fold line 245, and then the first fold line 241 are each folded 180 degrees. The second cavity panel 242, which includes the area of the cavity side panel 216 between the upper cut line 282 and the lower cut line 284, is glued to a back side of the back panel 218. The first glue panel 220 can then be glued to a back side of the side panel 212.

Figure 9:
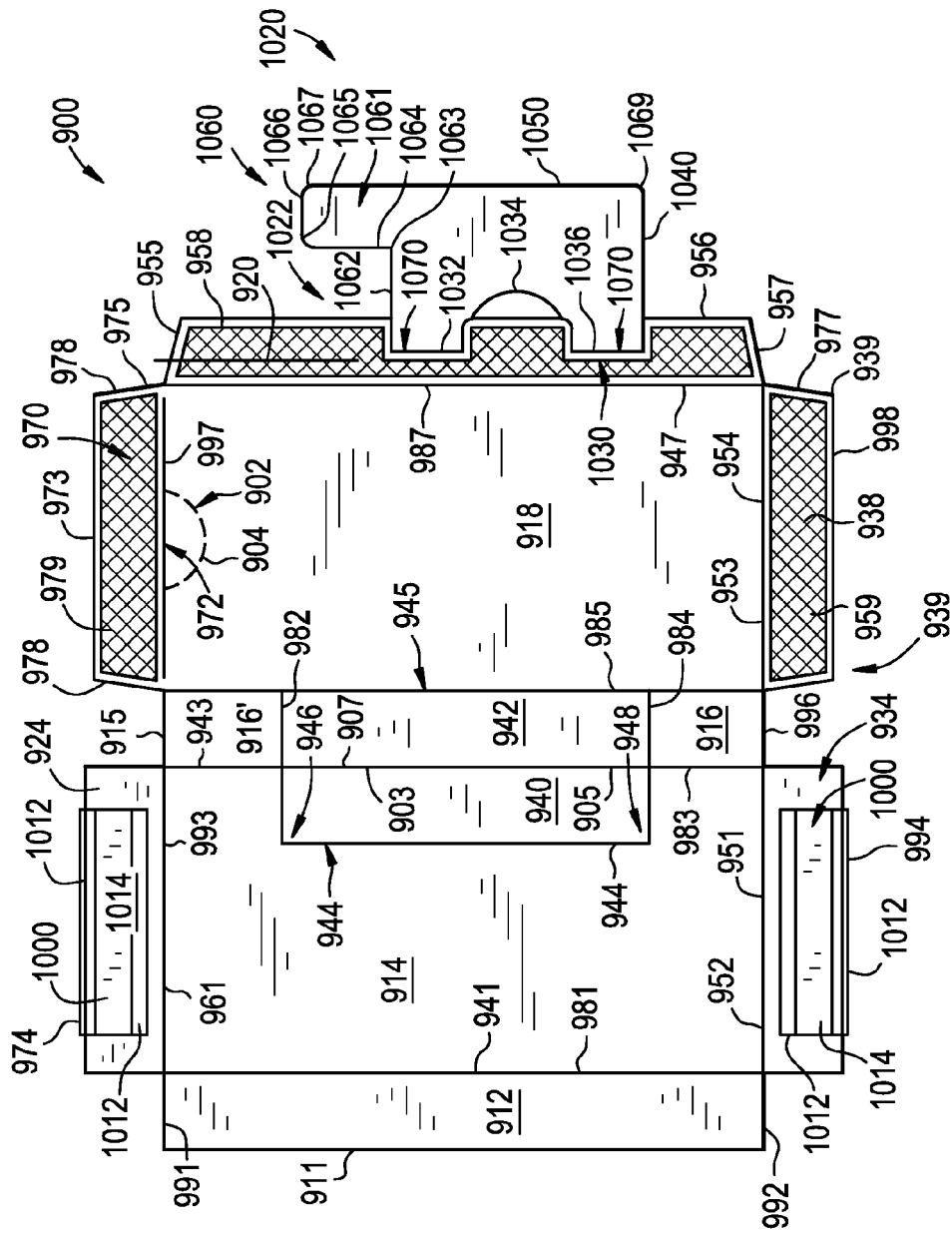

FIG. 9 is a plan view of a blank for forming an electronic vaping device package in accordance with some example embodiments.

Referring to FIG. 9, a blank 900 for forming a rectangular box (e.g., box 110 in FIG. 1) having a cavity (e.g., cavity 120 in FIG. 1), which is operable to contain a hollow elongated cylinder (e.g., elongated cylinder 130 in FIG. 1) is shown in FIG. 9. The blank 900 includes a first complete side panel 912 connected to a front panel 914 along a first fold line 941. The first fold line 941 extends along a first side edge 981 of the front panel 914. Upper and lower cavity side panel portions, 916, 916' (collectively cavity side panel 916) are connected to the front panel 914 along a second fold line 943. The second fold line 943 extends along a second side edge 983 of the front panel 914. A back panel 918 is connected to the cavity side panel 916 along a third fold line 945. The third fold line 945 extends along a first side edge 985 of the back panel 918. A first glue panel 920 connects to the back panel 918 along a fourth fold line 947. The fourth fold line 947 extends along a second side edge 987 of the back panel 918.

The side panel 912 includes a top edge 991 and a lower edge 992. A top panel 924 is connected to the front panel 914 along a fifth fold line 961. The fifth fold line 961 extends along a top edge 993 of the front panel 914. An outer bottom panel 934 is connected to the front panel 914 along a seventh fold line 951. The seventh fold line 951 extends along a bottom edge 952 of the front panel 914.

In accordance with some example embodiments, the back panel 918 can include a third (or top) glue panel 970 and a lower glue panel 938. The third glue panel 970 is connected to the back panel 918 along an eleventh fold line 972, which extends along an upper edge 997 of back panel 918. The eleventh fold line 972 may be a single fold line, or a plurality of fold lines collectively arranged in the form of a straight line. The plurality of fold lines may be spaced apart from each other in a horizontal direction. The second or lower glue panel 938 is connected to the back panel 918 along an eighth fold line 953. The eighth fold line 953 extends along a bottom edge 954 of the back panel 918.

The blank 900 also includes an upper cut line 982 and a lower cut line 984 extending transversely across an upper and a lower portion of the front panel 914 adjacent to the upper and lower side panel portions 916, 916' and extending across the cavity side panel 916, respectively. The upper cut line 982 and the lower cut line 984 collectively form a first cavity panel 940 and a second cavity panel 942 within the front panel 914 and between the side panel portions 916, 916', respectively. A ninth (scored) fold line 944 extends between an inner edge 946 of the upper cut line 982 and an inner edge 948 of the lower cut line 984 on the front panel 914. A tenth (scored) fold line 903 extends between the upper cut line 982 and the lower cut line 984 forming an outer edge 905 of the first cavity panel 940 and an inner edge 907 of the second cavity panel 942.

In accordance with some example embodiments, upon assembly of the box (e.g., box 110 in FIG. 1), the first cavity panel 940 and the second cavity panel 942 are positioned perpendicular to the front panel 914 and the cavity side panel 916, respectively. Panels 940 and 942 form the viewing window or side cavity 120. In accordance with some example embodiments, the cavity 120 receives the elongated hollow cylinder 130. In accordance with some example embodiments, the upper and lower cut lines 982, 984 extend across the front panel 914 a distance equal to a combined width of the front recess panel 140 and cavity side panel 142 as shown in FIG. 1.

In accordance with some example embodiments, the side panel 912 has a vertical free edge 911. The top panel 924, the bottom panel 934, the upper glue panel 970, and the bottom glue panel 938, each have a free outer edge 974, 994, 973, 998, respectively. The back panel 918 can include one or more cut lines 904 in a semi-circular shape 902 along and/or in a vicinity of the upper edge 997 of the back panel 918, which provides a tear line, which can assist and/or provide access for a consumer to the contents enclosed within the box 110, which can include the information booklet and/or coupon 150 and/or a USB charger 160.

The tear line can also function as a tamper-evident feature. For instance, when the eleventh fold line 972 is the plurality of fold lines spaced apart from each other in a horizontal direction, ends of the tear line may terminate in the space between adjacent fold lines. An outermost fold line of the adjacent fold lines having the ends of the tear line therebetween may have a first end portion extending towards the upper glue panel 970 and/or a second portion attached to an end of the first end portion. The second portion may extend parallel to the eleventh fold line 972 but along a different plane. Upon breaking the tear line provided by the cut lines 904, connectors are formed by the first and second end portions, and a tab defined by the broken cut lines 904 is formed attached to the back panel 918 by the connectors. The connectors are indicators that the display package has been tampered with. Upon breaking the tear line provided by the cut lines 904 and pulling the tab, the upper glue panel 970 may be separated from the back panel 918.

In accordance with some example embodiments, the blank 900 includes a divider panel 1020, which can have a rectangular shape thereto with one or more cutouts 1022 configured to receive, for example, a lower portion of a USB charger 160. The divider panel 1020 can include a left edge 1030, a bottom edge 1040, a right edge 1050, and a top edge 1060. In accordance with some example embodiments, the left edge is connected to the first glue panel 920 and can include an upper left edge 1032, a curved inner edge 1034, and a lower left edge 1036. The bottom edge 1040 extends outward from a lower edge 1033 of the left edge 1030 to the right edge 1050. The right edge 1050 extends upward to a raised portion 1061 of the top edge 1060. The top edge 1060 having an inner edge 1062, which extends outward to a vertical edge 1064, and an outer edge 1064. In accordance with some example embodiments, the transitions from the inner edge 1062 to the vertical edge 1064, the vertical edge 1064 to the outer edge 1064, and the outer edge 1064 to the right edge 1050 can be rounded edges 1063, 1065, 1067. In addition, the transition from the bottom edge 1040 to the right edge 1050 can be a rounded edge 1069.

In accordance with some example embodiments, the divider panel 1020 can have an overall height of about 60 mm to 70 mm, for example, about 63 mm, and a width of about 25 mm to 35 mm, for example, 30 mm. The upper and lower left edges 1032, 1036 can have a length of about 10 mm to 15 mm, for example, 13 mm. The curved inner edge 1034 can have a diameter of about 15 mm to 25 mm, for example, 20 mm. The bottom edge 1040 can have a length of about 25 mm to 35 mm, for example, 30 mm. The right edge 1050 can have a length of about 60 mm to 70 mm, for example, 63 mm. The inner edge 1062 of the top edge 1060 can have a length of about 18 mm to 20 mm, for example, 19 mm, the vertical edge 1064 can have a length of about 16 mm to 19 mm, for example, 17 mm, and the outer edge 1064 can have a length of about 8 mm to 14 mm, for example, 11 mm. In accordance with some example embodiments, the rounded edges 1063, 1065, 1067, and 1069 can have a radius of about 1 mm to 3 mm, for example, 2 mm. In accordance with some example embodiments, the outer edge 1066 of the top edge 1060 can be about 20 mm to 30 mm from the eleventh fold line 972, which extends along the upper edge 997 of back panel 918, for example, 24 mm.

In accordance with some example embodiments, an instruction booklet and/or a USB charger (or other item of the electronic vaping device) can be placed within the inner cavity 122 of the box 110. The divider panel 1020 is configured to receive (or support) an USB charger so as to retain the USB charger in a fixed position within the inner cavity of the box when the box is erected.

The blank 900 may include a finish or varnish on the clay (printable) side of the blank 900. In accordance with some example embodiments, the first glue panel 920, the second glue panel 938, and the third glue panel 970 can each include a varnish-free area or portion 958, 959, 979, respectively, which may improve the bonding formed by the glue, for example, a hot-melt adhesive material, and/or an adhesive or pressure sensitive tape 1000. In accordance with some example embodiments, the first glue panel 920 has a pair of angled edges 955, 957, which are slightly tapered to a vertical free edge 956. For example, in accordance with some example embodiments, the varnish-free areas 958, 979, 959 of the first glue panel 920, the top (or third) glue panel 970, and the bottom (or second) glue panel 920 can cover the entire panels 920, 970, 938.

In accordance with some example embodiments, the side panel 912 can have a width of about 12 mm to about 16 mm, for example, about 14 mm, and a height of about 105 mm to about 115 mm, for example, about 109 mm. The front panel 914 can have a width of about 50 mm to about 60 mm, for example, 55 mm and a height of about 105 mm to about 115 mm, for example, about 110 mm. The cavity side panel 916 (portions 916, 916') can have a width of about 12 mm to about 18 mm, for example, 15 mm and a height of about 105 mm to about 115 mm, for example, about 109 to 110 mm. The back panel 918 can have a width of about 50 mm to about 60 mm, for example, about 54.6 mm, and a height of about 105 mm to about 115 mm, for example, about 109 mm to 110 mm. The first glue panel 920 can have a width of about 11 mm to about 14 mm, for example, about 12.4 mm, and a height of about 105 mm to about 115 mm, for example, about 109 mm.

In accordance with some example embodiments, the first cavity panel 940 can have a height of about 65 mm to about 75 mm, for example 69 mm, and a width of about 14 mm to about 15 mm, for example, about 14.5 mm. The second cavity panel 942 can have a height of about 65 mm to about 75 mm, for example, 69 mm, and a width of about 13 mm to about 15 mm, for example, about 14 mm. Thus, upon assembly of the package 100, the depth (e.g., about 14.5 mm) of the viewing window or side cavity 120 is greater than a width (14.0 mm) of the viewing window or side cavity 120. In accordance with some example embodiments, a distance from the cut line 982 to the upper edges 993, 995 of the front panel 914 and the cavity side panel 916, and a distance from the cut line 984 to the lower edges 952, 996 of the front panel 914 and the cavity side panel 916, can be about 19 mm to about 22 mm, for example, about 20.5 mm.

In accordance with some example embodiments, the upper panel 924 can have a width of about 50 mm to about 60 mm, for example, about 55 mm, and a height of about 13 mm to about 15 mm, for example, about 14.0 mm. The bottom panel 934 can have a width of about 50 mm to about 60 mm, for example, about 55 mm and a height of about 13 mm to about 15 mm, for example, about 14.0 mm.

In accordance with some example embodiments, the first glue panel 920 has a pair of angled outer edges 955, 957, which extend from the second side edge 987 of the back panel 918 inward at an angle of about 10 to 30 degrees and more preferably about 20 degrees. In accordance with some example embodiments, the second glue panel 938 can have a width of about 50 mm to about 60 mm, for example, about 54.6 mm, and a height of about 12 mm to about 14 mm, for example, about 13.0 mm. The vertical edges 975, 977 of the third glue panel 970 and the second glue panel 938 can be angled, for example, angled at about 2.5 degrees to 7.5 degrees and more preferably about 5.0 degrees. In addition, the corners 978, 939 of the third and second glue panels 970, 938 can be rounded at a radius of about 0.5 mm to about 1.5 mm, for example, 1.0 mm.

In addition, the back panel 918 can have one or more cut lines 902 collectively in a semi-circular shape along an upper edge 997. In accordance with some example embodiments, the one or more cut lines 902 can have a radius of about 8.5 mm to about 10 mm, for example, 9.3 mm, and a depth of about 5 mm to about 7 mm, for example, about 5.7 mm. The cut lines 902 can be located in (or near) a center portion of the upper edge 997 of the back panel 918 so as to provide an equal distance from the first side edge 985 and the second side edge 987 to a corresponding lower edge 904 of the cut lines 902.

In accordance with some example embodiments, for example, the assembled box 110 can have a height of about 105 mm to about 115 mm, for example, about 110 mm, a width of about 50 mm to about 60 mm, for example, 55 mm, and a depth of about 14 mm to about 16 mm, for example, 15 mm. In addition, in a flat state, the blank 900 can have a height of about 130 mm to about 145 mm, for example, about 138 mm, and a width of about 170 mm to about 180 mm, for example, about 175 mm including the divider panel 1020.

Figure 10:
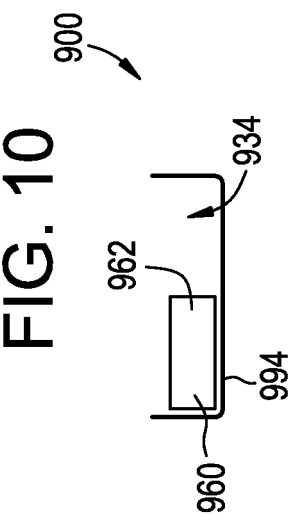

FIG. 10 is a partial view of the blank as shown in FIG. 9 for forming an electronic vaping device package in accordance with some example embodiments.

Referring to FIG. 10, a front side of a blank 900 can include a date code area 962 on the bottom panel 934. In accordance with some example embodiments, the date code area 962 can be on a varnish-free area 960. The date code area 962 can have a width of about 24 mm to 28 mm, for example 26 mm, and a height of about 10 mm to 12 mm, for example 11 mm. In accordance with some example embodiments, the date code area 962 can be positioned about 1.0 mm to 2.0 mm, for example, 1.5 mm from a left vertical edge and about 1.0 mm to 2.0 mm, for example, 1.5 mm from a lower free edge 994 of the bottom panel 934.

Figure 11:
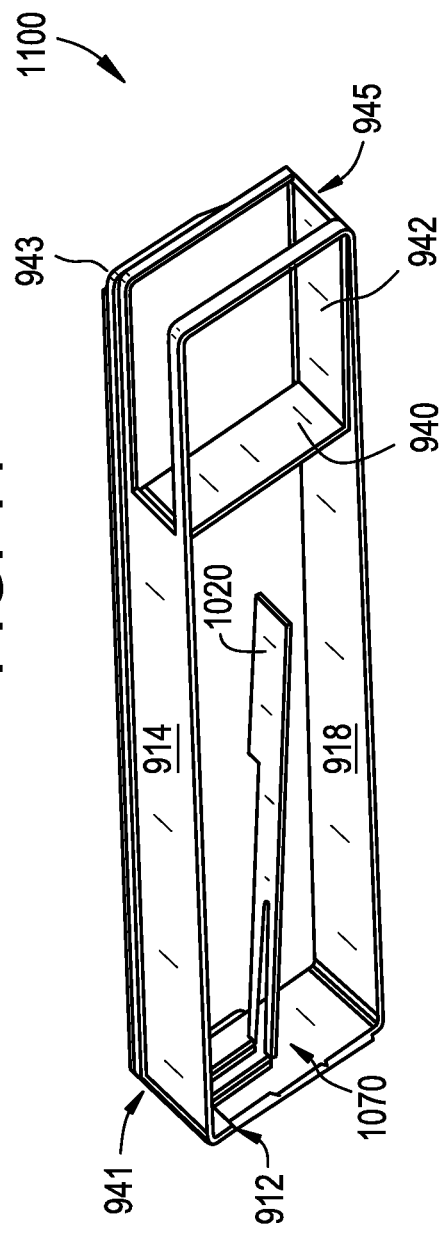

FIG. 11 is a bottom view of a partially erected blank as shown in FIG. 9 in accordance with some example embodiments.

Referring to FIG. 11, a resultant box structure 1100 formed by performing a method for assembling the box (e.g., box 110 in FIG. 1) from a single laminar blank 900 is provided. The laminar blank 900 is partially folded and glued prior to shipping to a facility for assembly. As shown in FIGS. 9 and 11, a pressure sensitive adhesive tape 1000 can be applied to the back side of the upper panel 924 and the bottom panel 934. The fourth fold line 947 is pre-broken or scored and folded 180 degrees. The twelfth fold line 1070 is folded 180 degrees. The third fold line 945 is folded 180 degrees, and the second cavity panel 942, which comprises the area of the cavity side panel 916 between the upper cut line 982 and the lower cut line 984 is glued to an adjacent inside portion (not shown) of the back panel 918. The first fold line 941 is folded 180 degrees, and the first glue panel 920 is then glued to a back side of the side panel 912.

In accordance with some example embodiments, the blanks 200, 600, 900 can be formed of a material selected from the group consisting of cardboard, paperboard, plastic, metal, or combinations thereof. For example, in some example embodiments, the blanks 200, 600, 900 can be formed of cardboard having a weight ranging from about 100 grams per square meter to about 350 grams per square meter. In FIGS. 2, 6, and 9, the clay coated side of the blanks 200, 600, and 900 is shown.

In accordance with some example embodiments, the blanks 200, 600, 900 can include one or more of printing, embossing, debossing, embellishments and combinations thereof on an outer surface of the blank 200, 600, 900.

In some example embodiments, the blanks 200, 600, 900 may be formed from any suitable materials including, but not limited to, cardboard, paperboard, plastic, metal, or combinations thereof. The blank 200, 600, 900 is formed from one or more folded laminar cardboard blanks. Also, the cardboard has a weight ranging from about 100 grams per square meter (gsm) to about 350 grams per square meter.

In some example embodiments, exterior surfaces of the box 110 may be printed, embossed, debossed or otherwise embellished with manufacturer or brand logos, trademarks, slogans and other consumer information and indicia.

As used herein, the terms "front", "back", "upper, "lower", "side", "top", "bottom", "left", "right" and other terms used to describe relative positions of the components of the box refer to the box 110 in an upright position.

In accordance with some example embodiments, the fold and/or score lines can be 2 pt. rule. Cut lines can be about 2.5 mm to about 3.0 mm cut lines depending on locations of the cut lines within the blank.

As used herein, the term "longitudinal" refers to a direction from bottom to top or vice versa of the box 110. The term "transverse" refers to a direction perpendicular to the longitudinal direction.

In accordance with some example embodiments of the present disclosure, a fold line can be any substantially linear, although not necessarily straight, form of weakening that facilitates folding therealong. More specifically, but not for the purpose of narrowing the scope of the present disclosure, fold lines include a score line, such as lines formed with a blunt scoring knife, or the like, which creates a crushed portion in the material along the desired line of weakness. In addition, cut line extends partially into and/or completely through the material along the desired line of weakness so as to separate one portion of a panel or panels from another portion of a panel or panels.

In this specification, the word "about" is sometimes used in connection with numerical values to indicate that mathematical precision is not intended. Accordingly, where the word "about" is used with a numerical value, that numerical value should be interpreted to include a tolerance±10% of the stated numerical value.

The foregoing is illustrative of some example embodiments and is not to be construed as limiting thereof. Although a few example embodiments have been described, those skilled in the art will readily appreciate that many modifications are possible in example embodiments without materially departing from the novel teachings. Accordingly, all such modifications are intended to be included within the scope of the disclosure as defined in the claims. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A package for displaying a selected portion of an electronic vapor device, the package comprising:
    a box structure having an inner cavity and a side portion, the box structure including a front panel, a back panel, a first side panel and a second side panel, the second side panel being formed by a union of a first glue panel with a first complete side panel, an outer surface of the first glue panel being connected to an inner surface of the first complete side panel,
    said side portion divided into a lower retention portion, an upper retention portion, and a window recess portion, and
    said window recess portion between said upper and lower retention portions; and
    said window recess portion including,
        a side recess panel at a first location along a first side panel of said box structure, and
        a front recess panel along a front panel of said box structure, said front recess panel being attached to said side recess panel,
        said front recess panel having a width greater than a width of the side recess panel such that a depth of said window recess portion is greater than a width of said window recess portion, and
        said side and front recess panels being folded into said box structure; and
    a divider panel being within said inner cavity, a portion of a proximal end of the divider panel being connected to the first glue panel and being connected to the inner surface of the first complete side panel, a distal end of the divider panel including at least two collinear fold lines that define a pivoting axis line running along a width of the divider panel, wherein portions of the divider panel on both sides of the pivoting axis line form an outer panel including an adhesive configured to be adhesively bonded to the front recess panel,
    said window recess portion, said upper retention portion and said lower retention portion being mutually arranged to retain said electronic vaping device along said side portion, with the selected portion of said electronic vaping device being displayed along said recess portion.

2. The package of claim 1, wherein said side recess panel is adhesively bonded to an adjacent portion of the back panel of said box structure.

3. The package of claim 1, wherein said upper and lower retention portions block selected portions of said electronic vaping device from view.

4. The package of claim 1, further comprising:
    a tubular body configured to visibly contain the electronic vaping device within said recess portion.

5. The package of claim 1, wherein the divider panel, the front recess panel, the second side panel and the front panel are mutually arranged to form a first inner cavity portion configured to contain an information booklet in a manner that the information booklet is not visible to a consumer.

6. The package of claim 5, wherein the divider panel is configured to support at least a portion of an end of a universal serial bus (USB) charger within the inner cavity.

7. The package of claim 5, wherein a proximal portion of the outer panel is at least partially defined by one of score lines and a central cut line, the outer panel being further defined by the two collinear cut lines.

8. The package of claim 7, wherein the proximal portion of the outer panel of the divider panel is U-shaped.

9. The package of claim 7, wherein an upper portion of the remainder of the divider panel, that is not the outer panel of the divider panel, defines an upper cutout region of the divider panel, the upper cutout region being substantially square in shape.

10. A blank for forming a display package for containing an elongated body housing an electronic vaping device, the blank comprising:
    a side panel connected to a front panel along a first fold line, the first fold line extending along a first side edge of the front panel;
    a cavity side panel connected to the front panel along a second fold line, the second fold line extending along a second side edge of the front panel;
    a back panel connected to the cavity side panel along a third fold line, the third fold line extending along a first side edge of the back panel;
    a first glue panel connected to the back panel along a fourth fold line, the fourth fold line extending along a second side edge of the back panel; a top panel connected to the front panel along a fifth fold line, the fifth fold line extending along a top edge of the front panel;

a bottom panel connected to the front panel along a sixth fold line, the sixth fold line extending along a bottom edge of the front panel;

a second glue panel connected to the back panel along a seventh fold line, the seventh fold line extending along a bottom edge of the back panel;

a divider panel connected to the first glue panel along an eighth fold line;

a first complete side panel connected to the front panel along a ninth fold line, the ninth fold line extending along a side edge of the front panel; and an upper cut line and a lower cut line respectively extending across an upper portion and a lower portion of the front panel adjacent to the cavity side panel, the upper and lower cut lines extending across the cavity side panel, respectively, so as to define a first cavity panel and a second cavity panel, said first cavity panel having a width greater than a width of the second cavity panel, upon assembly of the display package, the first cavity panel and the second cavity panel being perpendicular to the front panel and the cavity side panel, respectively, so as to form a side cavity configured to receive the elongated body, a portion of a proximal end of the divider panel being connected to an inner surface of the first complete side panel, a distal end of the divider panel includes at least two collinear fold lines that define a pivoting axis line running along a width of the divider panel, wherein portions of the divider panel on both sides of the pivoting axis line form an outer panel that is configured to be adhesively bonded to an inner surface of the first cavity panel so as to divide an inner cavity of the box, and the display package having a substantially rectangular shape.

11. The blank of claim 10, further comprising:
a first upper dust panel connected to the first complete side panel along a top edge of the side panel;
a second upper dust panel connected to the cavity side panel along a top edge of the cavity side panel;
a first lower dust panel connected to the first complete side panel along a lower edge of the side panel; and
a second lower dust panel connected to the cavity side panel along a lower edge of the cavity side panel,
the top panel having a upper flap panel and an end panel, and
the upper flap panel being connected to the end panel along a tenth fold line.

12. The blank of claim 11, wherein sidewalls of the first and second upper dust panels are recessed.

13. The blank of claim 10, further comprising:
an eleventh fold line connecting an inner edge of the upper cut line and an inner edge of the lower cut line on the front panel.

14. The blank of claim 10, further comprising:
a varnish-free area on the bottom panel, the varnish-free area being configured to include a date code area.

15. The blank of claim 10, further comprising:
a recess cut line within an upper edge of the back panel.

16. The blank of claim 10, wherein a proximal portion of the outer panel is at least partially defined by one of score lines and a central cut line, the outer panel being further defined by the two collinear cut lines.

17. The blank of claim 16, wherein the proximal portion of the outer panel of the divider panel is U-shaped.

18. The blank of claim 16, wherein an upper portion of the remainder of the divider panel, that is not the outer panel of the divider panel, defines an upper cutout region of the divider panel, the upper cutout region being substantially square in shape.

19. The blank of claim 10, wherein the first cavity panel has a width greater than a width of the second cavity panel.

20. A blank for forming a box for containing an elongated body housing an electronic vaping device, the blank comprising:

a side panel connected to a front panel along a first fold line, the first fold line extending along a first side edge of the front panel;

a cavity side panel connected to the front panel along a second fold line, the second fold line extending along a second side edge of the front panel;

a back panel connected to the cavity side panel along a third fold line, the third fold line extending along a first side edge of the back panel;

a first glue panel connected to the back panel along a fourth fold line, the fourth fold line extending along a second side edge of the back panel;

a top panel connected to the front panel along a fifth fold line, the fifth fold line extending along a top edge of the front panel;

a bottom panel connected to the front panel along a sixth fold line, the sixth fold line extending along a bottom edge of the front panel;

a second glue panel connected to the back panel along a seventh fold line, the seventh fold line extending along a bottom edge of the back panel;

a third glue panel connected to the back panel along a ninth fold line, which extends along the upper edge of the back panel;

a divider panel connected to first glue panel along an eighth fold line;

a first complete side panel connected to the front panel along a tenth fold line, the tenth fold line extending along a side edge of the front panel; and an upper cut line and a lower cut line respectively extending across an upper portion and a lower portion of the front panel adjacent to the cavity side panel, the upper and lower cut lines extending across the cavity side panel, respectively, so as to define a first cavity panel and a second cavity panel, and the upper edge of the back panel defining a series of cut lines, upon assembly of the display package,
the first cavity panel and the second cavity panel being perpendicular to the front panel and the cavity side panel, respectively, so as to form a side cavity configured to receive the elongated body, a portion of a proximal end of the divider panel being connected to an inner surface of the first complete side panel, a distal end of the divider panel is configured to remain free-floating within the assembled display package, and the display package having a substantially rectangular shape, the series of cut lines on the back panel defining a semi-circular shape that forms a tear line on an outer-most surface of the back panel of the assembled display package, the tear line being capable of assisting in the opening of an upper end of the assembled display package.

21. The blank of claim 20, further comprising:
an eleventh fold line connecting an inner edge of the upper cut line and an inner edge of the lower cut line on the front panel; and
a twelfth fold line extending between the upper cut line and the lower cut line respectively forming an outer edge of the first cavity panel and an inner edge of the second cavity panel.

22. The blank of claim 20, further comprising:
a first upper dust panel connected to the side panel along a top edge of the side panel; and
a varnish-free area on the bottom panel, the varnish-free area being configured to include a date code area.

23. The blank of claim 20, wherein an upper portion of the divider panel at least partially defines an upper cutout region, the upper cutout region being substantially rectangular in shape.

24. The blank of claim 20, wherein the first cavity panel has a width greater than a width of the second cavity panel such that a depth of the side cavity is greater than a width of the side cavity.

\* \* \* \* \*